Patented Feb. 24, 1931

1,794,057

UNITED STATES PATENT OFFICE

EDGAR C. BRITTON AND WILLIAM H. WILLIAMS, OF MIDLAND, MICHIGAN, ASSIGNORS TO THE DOW CHEMICAL COMPANY, OF MIDLAND, MICHIGAN, A CORPORATION OF MICHIGAN

METHOD OF MAKING DIMETHYL ANILINE

No Drawing.   Application filed April 9, 1927.   Serial No. 182,532.

The usual method of preparing dimethyl aniline is to heat aniline, methyl alcohol and a small amount of sulphuric acid at a temperature of 220 to 230 degs. C. for from 7 to 10 hours. German Patent No. 250,236 discloses a similar method in which elementary iodine is substituted for sulphuric acid, the action of such iodine being described as that of a catalyst, while in the more recent United States patent to Homer Rogers No. 1,413,494, dated April 18, 1922, the use of phenyl trimethyl-ammonium iodide instead of such iodine is recommended as a catalyst.

The sulphuric acid method referred to above has the objection that methyl ether is produced as a troublesome by-product as well as phenyltrimethyl ammonium sulphate, which is a very stable compound and has later to be decomposed by caustic alkalies under pressure. The modified processes involving the use of iodine and phenyltrimethyl ammonium iodide both produce a dimethyl aniline contaminated with the iodine derivative which can only be eliminated by special and costly procedure. The presence of this iodine compound causes the dimethyl aniline to darken very rapidly on exposure to air thus making the product unfit for sale or use.

We have now discovered that methyl bromide can well be employed in amounts equal to from 1 to 2 per cent of the aniline to effect a complete conversion of the latter to dimethyl aniline by reaction with methyl alcohol. Not only does the use of such bromide facilitate the reaction to a remarkable degree but the dimethyl aniline product produced is of very high purity and can be exposed to the air for a long time without any detrimental effects.

The invention then consists of the steps and detailed modifications thereof hereinafter fully described and fully pointed out in the claims, the following description setting forth but several of the various ways in which the principle of the invention may be used.

The action of the methyl bromide as employed in the present process may be indicated by the following equations viz:

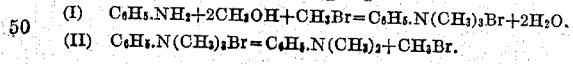

The methyl bromide can be introduced either as methyl bromide itself or in the form of phenyltrimethyl ammonium bromide, for at the temperature of reaction the quaternary bromide produces methyl bromide by decomposition according to Equation (II). Obviously any material capable of yielding methyl bromide by decomposition under the reaction conditions may similarly be used.

As a specific example of our improved process for making dimethyl aniline we add 1 to 2 parts of methyl bromide either as a liquid or a gas, to 93 parts of aniline and 96 to 128 parts of methyl alcohol, the proportion of methyl bromide being substantially less than a molecular equivalent while the proportion of aniline to methyl alcohol is approximately that of one molecule of the former to from 3 to 4 molecules of the latter.

The foregoing mixture of ingredients is then heated in an iron autoclave for from 12 to 20 hours at a temperature of from 230 to 240 degs. C. and under a corresponding pressure, e. g. about 700 pounds per square inch. The mixture should moreover be continuously stirred while the reaction proceeds. At the end of the reaction, which may readily be determined by distillation and freezing point of dimethyl aniline, the autoclave is cooled and the contents discharged into a still. Here the entire mass is distilled, the alcohol which comes over first being set aside for use over again; water then follows mixed with dimethyl aniline; and finally the main body of dimethyl aniline is distilled over under reduced pressure. Most of the methyl bromide in the form of the quaternary compound referred to above will be recovered in the still residue although some will be lost in the distillate.

The alcohol and such quaternary bromide compound are then used in making up a fresh reaction mixture and the operation just described is repeated.

The products of the reaction as discharged from the autoclave instead of being distilled as a whole in the fashion just described may, on the other hand, be permitted to stand so as to effect a separation of the mass into aqueous alcohol and dimethylaniline-alcohol layers. The latter may thereupon be washed with water and distilled directly. The wash water obtained from the washing of this layer is thereupon added to the aqueous alcohol layer which will then contain all the methyl bromide in the form of phenyltrimethyl-ammonium bromide, so that upon concentrating this solution with consequent recovery of alcohol and dissolved dimethyl aniline, substantially all of the methyl bromide in the form of quaternary compound may be recovered and so be available for reintroduction into the system.

Whether such compound be obtained as the residue from the distillation method of separating the products of the reaction, as first described above, or as the residue remaining from this last described method of recovery, the compound should be dissolved in aniline, preparatory to its use over again.

While the temperature of reaction is best maintained at from 230° to 240° C., as above indicated, a somewhat lower temperature may be employed although the use of a temperature as low as 200 degs. C. is not advisable inasmuch as the decomposition of the quaternary bromide according to Equation (II) will be so slow as to prolong the time of the reaction. On the other hand, if the temperature be carried as high as 260 degs. there is a tendency for such quaternary bromide to decompose into toluidines and derivatives thereof.

As indicated above, any alcohol that goes through the reaction unchanged is recovered for use over again, and this will also apply to any of the aniline in case this is not entirely used up. Under certain conditions, moreover, more or less monomethyl aniline will be formed; for example by shortening the time of reaction from that specified, or by decreasing the relative amount of methyl alcohol employed. Indeed by proper control in these respects, the process can be run so as to produce substantially all monomethyl, instead of di-methyl aniline. Where both are produced, they will be taken out together by either of the two methods of recovery, and if desired may be subsequently separated by appropriate treatment or may be utilized as a mixture.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. In a method of making a methyl-aniline, the step which consists in heating a mixture of aniline and methyl alcohol with addition of a relatively small amount of methyl bromide.

2. In a method of making dimethyl aniline, the step which consists in heating a mixture of aniline and methyl alcohol (approximately one molecule of the former to from 3 to 4 molecules of the latter) with substantially less than a molecular equivalent of methyl bromide.

3. In a method of making dimethyl aniline, the step which consists in heating a mixture of aniline and methyl alcohol with addition of a relatively small amount of methyl bromide at a temperature of from 200° to 260° C. and corresponding pressure until the reaction is complete.

4. In a method of making dimethyl aniline, the steps which consist in heating a mixture of analine and methyl alcohol with a relatively small amount of methyl bromide, recovering phenyl-trimethyl-ammonium bromide from the reaction products and using such compound in a succeeding operation for the methyl bromide therein.

5. In a method of making dimethyl aniline, the steps which consist in heating a mixture of aniline and methyl alcohol with a relatively small amount of methyl bromide at a temperature of from 200° to 260° C. and a corresponding pressure until reaction is complete, recovering phenyl-trimethyl-ammonium bromide from the reaction products and using such compound in a succeeding operation for the methyl bromide therein.

6. In a method of making dimethyl aniline, the steps which consist in heating a mixture of aniline and methyl alcohol with a relatively small amount of methyl bromide, permitting the reaction products to stand with formation of one layer containing principally dimethyl aniline and an aqueous layer containing phenyl-trimethyl-ammonium bromide dissolved therein, evaporating said aqueous layer to recover said compound and using the latter in a succeeding operation for the methyl bromide therein.

7. In a method of making a methyl aniline, the step which consists in heating a mixture of aniline and methyl alcohol with addition of a relatively small amount of phenyl-trimethyl-ammonium bromide.

8. In a method of making dimethyl aniline, the step which consists in heating a mixture of aniline and methyl alcohol with addition of a relatively small amount of phenyl-trimethyl-ammonium bromide, at a temperature of from 200° to 260° C. and corresponding pressure until the reaction is complete.

Signed by us this 1st day of April, 1927.

EDGAR C. BRITTON.
WILLIAM H. WILLIAMS.